Patented Nov. 25, 1952

2,619,424

UNITED STATES PATENT OFFICE 2,619,424

PREPARATION OF DEHYDRATED CARROTS

Mortimer P. Masure, El Cerrito, Calif., assignor to the United States of America as represented by the Secretary of Agriculture No Drawing. Application March 5, 1951, Serial No. 213,998

4 Claims. (Cl. 99—204)

(Granted under the act of March 3, 1883, as amended April 30, 1928; 370 O. G. 757)

The invention herein described may be manufactured and used by or for the Government of the United States of America for governmental purposes throughout the world without the payment to me of any royalty thereon.

This invention relates to the preservation of carrots, particularly to processes for preparing dehydrated carrots of superior storage qualities.

It is well known in the art that carrots can be preserved by dehydration. The usual method of preparing dehydrated carrots involves peeling the carrots, dicing them, then treating the diced carrots to inactivate their enzyme content. This enzyme inactivation is carried out by blanching with steam or hot water and is usually followed by the use of a sulphiting agent to further retard oxidative changes. The treated dice are then dehydrated to a moisture content of about 5 to 6%. The products so produced have been generally accepted in commerce although their storage properties are poor. Thus upon storage the dehydrated carrots gradually lose their natural color and flavor, and develop off-flavor and their content of carotene decreases.

It has now been found that if carrots are subjected to a particular sequence of steps, a dehydrated product of superior storage quality is produced. The essence of my novel process involves first subjecting the carrots to dehydration then moistening them and finally dehydrating them. The products so produced have superior storage properties and will retain their natural color and flavor and carotene content for extended periods of time.

The process of this invention is carried out as follows:

Raw carrots are subjected to the usual steps of washing, peeling, and slicing or dicing. The carrots are then treated to inactivate their enzyme content. This may be done by heat treatment with steam or hot water. For example, the carrots may be subjected to steam for about 5-6 minutes. If desired, chemical methods may be used to further retard oxidative deterioration. Thus the carrots may be dipped in an aqueous solution containing sulphur dioxide, sodium bisulphite, sodium sulphite or other well known sulphiting agents. If desired, the carrots may be subjected to sulphur dioxide gas. However, I prefer to employ only blanching with steam or hot water, as the sulphiting treatment is prohibited in several States and further introduces a foreign flavor. One of the significant advantages of my process is that the sulphiting step which is generally used in preparing conventional dehydrated carrots can be omitted and yet a superior final product is obtained. After inactivation of enzymes, the carrots are subjected to dehydration. This is accomplished by any of the methods as well known in the art of dehydrating fruits, vegetables, and other perishable foodstuffs. The most common method is to place the carrots on trays and pass them through a cabinet where they are subjected to a blast of heated air at a temperature of from about 140° F. to about 160° F. The dehydration is continued until the moisture content of the carrots is below 20%.

The dehydrated carrots are then moistened. In carrying out this step it is convenient to place the carrots in a vessel, cover them with water and allow them to remain in contact with the water, preferably with agitation, for a short period of time, say, from 3 seconds to 3 minutes. The moistened carrots are then drained to remove excess water.

As an alternative mode of procedure, the dehydrated carrots may be moistened with an aqueous starch solution. The starch coating thus produced on the carrots assists in preserving the color of the final product although as shown in the examples, the absorbed water is the primary factor which causes improvement in stability of color and carotene content. The concentration of starch in the aqueous solution is not critical although the solution should be fluid enough so that it can be readily absorbed into the carrot tissue. In general, concentration up to about 5% starch may be used and the starch may be derived from corn, wheat, tapioca, potatoes and other cereals and tubers. In any case, the starch should be solubilized as by boiling in water or by conducting a limited hydrolysis of the native starch with an acid or a diastatic enzyme. The moistening with the starch solution is carried out in the same manner as with water and the carrots are then drained to remove excess solution.

The moistened, drained carrots are then subjected to dehydration. This is accomplished by any of the methods as well known in the art of dehydrating fruits, vegetables, and other perishable foodstuffs. Thus the carrots may be placed on trays and passed through a cabinet where they are subjected to a blast of air heated to a temperature of from about 140° F. to about 160° F. The dehydration is continued until the carrots have a moisture content less than about 10%, preferably about 5% to about 6%.

The fact that the dehydrated carrots produced in accordance with this invention are superior to those produced by conventional methods is surprising. A person skilled in the art would believe that the additional steps of hydration and final dehydration would cause increased damage to the cellular structure of the vegetables and thus would yield an inferior product. The reason for obtaining the superior products is not known for certain but it is believed that in the hydration or moistening step the water readily enters the tissues of the carrots which have been made hydrophilic by the initial dehydration. This absorption and penetration of water causes a swelling and very thorough gelling of the colloidal materials within the carrot tissue whereby a sealing effect is obtained throughout the carrot. This sealing then retards entry of oxygen into the carrot, hence retards oxidation which is the prime cause of loss of color and decrease of carotene content upon storage.

A further advantage of my process is that batches of conventionally dehydrated carrots which have lost their natural color due to storage can be treated to restore their color. To this end the "bleached" dehydrated product is simply moistened and then dehydrated. During the moistening step, it is observed that the color of the carrots is deepened to an orange or red color which remains essentially stable during the subsequent dehydration and storage.

The following examples exhibit the invention in greater detail. It is understood that these examples are submitted only by way of illustration and not limitation.

In most of the storage tests set forth in the examples, the products were stored at 85° F. in an atmosphere of oxygen. This represents an accelerated type of storage test and deliberately adverse conditions are used so that the ageing will proceed more rapidly and the product put to a more severe test than it would under ordinary storage conditions. Obviously in practice one would not store the products in an atmosphere of oxygen but would store them under vacuum or in air or in an atmosphere of nitrogen, carbon dioxide, or other inert gas.

*Example I*

A sample of dehydrated carrots was procured. This product had been prepared by dicing raw carrots, blanching them with steam, and dehydrating them to a moisture content of 5–6%. The dehydrated carrots were divided into three 390-gram batches, each batch being separately treated as follows:

(A) (*Control*).—One batch of dehydrated carrots was placed in a mason jar with no treatment at all, the jar was sealed and stored at 85° F.

(B) (*Control*).—The second batch of dehydrated carrots was placed in a mason jar. The air in the jar was displaced by introducing oxygen gas into the jar through a tube. The jar was then sealed and stored at 85° F.

(C) The third batch of dehydrated carrots was placed on a strainer suspended in a pan of water. The carrots were stirred while in contact with the water for about 2 minutes. The strainer was then raised and the carrots allowed to drain. The drained carrots were dried in a tunnel drier (air temperature 150° F.) until they had reached a moisture content of 6.1%. The dehydrated carrots were then placed in a mason jar. The air in the jar was displaced with oxygen gas and the jar sealed and stored at 85° F.

After storage for 8 weeks at 85° F., the samples were examined and analyzed for their carotene content. It was observed that the control samples were both pale yellow in color; the control sample stored in air (A) had retained 43.9% of its original carotene content and the control sample stored in oxygen (B) had retained only 25.1% of its original carotene content. Product (C) had a bright orange color and had retained 66.2% of its original carotene content. The carotene analyses show clearly that the product produced in accordance with this invention (sample C) stored in oxygen retained a greater proportion of its carotene content than did the control sample (A) which was stored under less severe conditions in air. The conditions used and the results obtained in this example are summarized in the following table:

| Sample | Method of preparation | Atmosphere in package | Color after 8 weeks' storage at 85° F. | Proportion of original carotene retained after 8 week' storage at 85° F., Per Cent |
|---|---|---|---|---|
| A | Conventional dehydration. | air | pale yellow | 43.9 |
| B | ----do---- | oxygen | ----do---- | 25.1 |
| C | Dehydration, moistening, dehydration. | ----do---- | bright orange | 66.2 |

*Example II*

A lot of dehydrated carrots was procured. This product had been prepared by dicing raw carrots, blanching them with steam and dehydrating them to a moisture content of 5–6%. The dehydrated carrots were divided into three 160-gram batches.

(A) (*Control*).—One batch of the dehydrated carrots was placed in a mason jar. The air is the jar was displaced by introducing oxygen gas into the jar. The jar was then sealed and stored at 85° F.

(B) The second batch of dehydrated carrots was placed in a sieve and the sieve was dipped into a vessel containing water. The dehydrated carrots were allowed to remain in the water for 5 seconds then the sieve was lifted and the excess water allowed to drain off. The moistened carrots were then dehydrated in a tunnel drier (air temperature 150° F.) to a moisture content of 6%. The product was then placed in a mason jar, the air displaced with oxygen gas and the jar sealed. The packaged product was stored at 85° F.

(C) The third batch of dehydrated carrots was treated exactly as in the case of batch B except that in this case, the dehydrated carrots were kept in contact with water for 60 seconds. The moistened carrots were dehydrated, packaged, and stored as with batch B.

After 6 months' storage at 85° F., the respective products were examined. It was noted that the control sample (A) was pale yellow in color whereas products B and C produced in accordance with this invention were orange in color. After 22 months' storage at 85° F. the products were re-examined. It was noted that control sample (A) was pale yellow in color whereas products B and C produced in accordance with this invention were still orange in color.

*Example III*

Raw carrots are diced, blanched with steam and dehydrated to a moisture content of 5-6%. The dehydrated carrots were divided into three batches, each batch being separately treated as follows:

(1) (*Control*).—One batch of dehydrated products was placed in a mason jar. The air in the jar was displaced with oxygen and the jar sealed and stored at 85° F.

(2) The second batch of dehydrated carrots was agitated in a bath of water for 20 seconds then removed, drained, and dehydrated in a conventional drier at 150° F. The product was placed in a mason jar, the air in the jar displaced with oxygen and the jar sealed and stored at 85° F.

(3) The third batch of dehydrated carrots was agitated in a 2.5% aqueous solution of corn starch for 20 seconds, then removed, drained, and dehydrated in a conventional drier at 150° F. The product was placed in a mason jar, the air in the jar displaced with oxygen and the jar sealed and stored at 85° F.

After storage for 21 months at 85° F., the samples were examined. It was noted that control sample (1) had a straw color; sample (2) had an orange color; sample (3) had a red-orange color.

Having thus described the invention, what is claimed is:

1. A process of improving the storage properties of dehydrated carrots which comprises moistening the dehydrated carrots and then dehydrating the moistened carrots to a moisture level below about 10%.

2. A process of improving the storage properties of dehydrated carrots which comprises immersing the dehydrated carrots in water, draining the moistened carrots and then dehydrating them to a moisture level below about 10%.

3. A process of improving the storage properties of dehydrated carrots which comprises immersing the dehydrated carrots in an aqueous starch solution, draining the moistened carrots and then dehydrating them to a moisture level below about 10%.

4. A process of preparing discrete pieces of blanched, non-chemically treated, substantially non-leached uncooked carrots which retain their color and the major part of their original carotene content upon subjection to accelerated ageing tests by storage for several weeks in an atmosphere in which the air is displaced by oxygen, comprising: dicing raw carrots, blanching them with an agent of the group consisting of steam and hot water to inactivate their enzyme content, dehydrating the discrete pieces of carrots by means of a blast of hot air until the moisture content of the carrots is below 20%, immersing the discrete pieces of carrot in water at room temperature for three seconds to three minutes to moisten them, to cause absorption and penetration of the water into the tissues of the carrot, whereby swelling and gelling of the colloidal materials within the carrot tissue occurs, draining the water from the carrots, and dehydrating the diced carrots in a blast of hot air to a moisture content of about 5 to 6 percent.

MORTIMER P. MASURE.

REFERENCES CITED

The following references are of record in the file of this patent:

UNITED STATES PATENTS

| Number | Name | Date |
| --- | --- | --- |
| 1,609,720 | Humphrey | Dec. 7, 1926 |
| 2,425,117 | Newsom | Aug. 5, 1947 |
| 2,444,579 | Newsom | July 6, 1948 |
| 2,541,701 | Karmen | Feb. 13, 1951 |